June 11, 1963 C. T. WILKINS 3,093,350
AIRCRAFT WING WITH NOSE FLAP AND BOUNDARY LAYER CONTROL
Filed Aug. 1, 1961 3 Sheets-Sheet 1

Inventor
Charles Timothy Wilkins
By Karl W. Flocks
Attorney

June 11, 1963  C. T. WILKINS  3,093,350
AIRCRAFT WING WITH NOSE FLAP AND BOUNDARY LAYER CONTROL
Filed Aug. 1, 1961  3 Sheets-Sheet 3

Inventor
Charles Timothy Wilkins
By Karl W. Flocks
Attorney

_United States Patent Office_

3,093,350
Patented June 11, 1963

3,093,350
AIRCRAFT WING WITH NOSE FLAP AND BOUNDARY LAYER CONTROL
Charles Timothy Wilkins, Harmer Green, Welwyn, England, assignor to The De Havilland Aircraft Company Limited
Filed Aug. 1, 1961, Ser. No. 128,460
Claims priority, application Great Britain, Aug. 4, 1960
13 Claims. (Cl. 244—42)

This invention relates to aircraft and in particular to aircraft surfaces over which enveloping fluid flows during aircraft forward movement and which have two adjacent parts which are relatively movable to a position in which they are separated.

One such aircraft surface is a droop nose aircraft wing, by which is meant an aircraft wing having a nose section pivotally mounted adjacent its lower trailing edge on a main wing section for movement from a normal flight position in which the nose section and main section have a common chord line, to a drooped position in which the nose section chord line extends forwardly and downwardly from the main section chord line. In the drooped position there is a space between the upper trailing edge of the nose section and the upper leading edge of the main section.

According to the invention, there is a closure member for the space between the surface parts in their separated position, the closure member including a permeable element across which a pressure differential is producible, and being movable to a retracted position in which the permeable element is covered by the surface parts in their adjacent position.

According to another feature of the invention, a droop nose aircraft wing has a closure member, for the space between the nose and main sections, movable from an operative position in the drooped position of the nose section, in which the outer wall forms a continuation of the upper surfaces of the nose and main sections to a retracted flight position which permits return of the nose section to its normal flight position, the outer wall being formed at least in part by a permeable element spaced from an inner wall to form a chamber therebetween, means being connectible to the chamber to produce a pressure differential across the porous element.

The chamber may be connectible at will to suction means or to pressure means.

The closure member is preferably pivotably mounted on the main wing section and its movement correlated with that of the nose section. In this case, the chamber may have an extensible tube for connection to a duct in the main wing section.

There may be a number of nose sections each with a closure member; or a number of closure members for each nose section. In either case, the chambers of the closure members are preferably connected by means of a common duct in the wing.

The scope of the invention is defined by the appended claims; and how it can be carried into effect is hereinafter particularly described, with reference to the accompanying drawings, in which:

Figure 2:
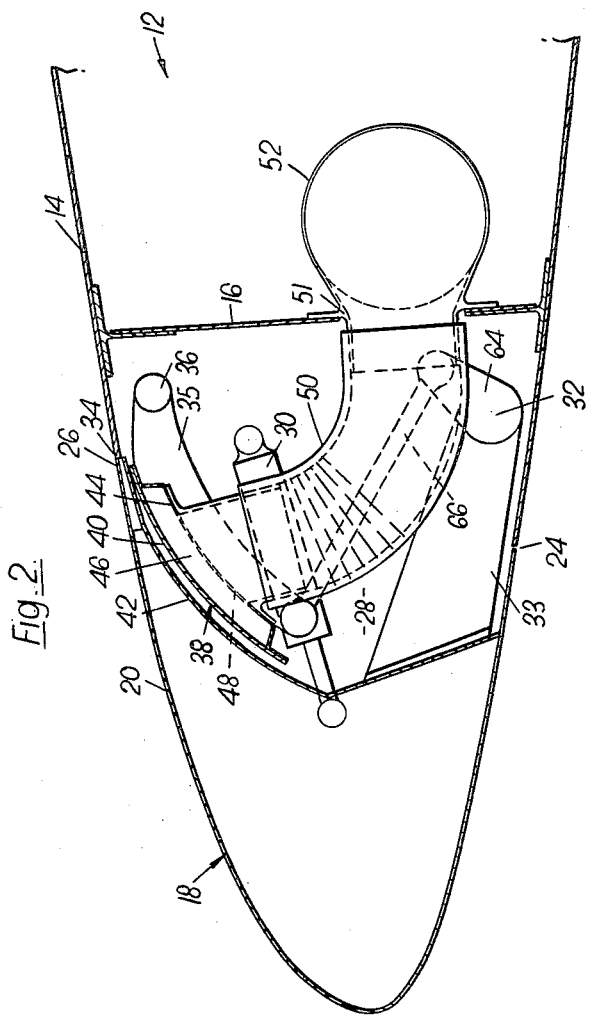
FIGURE 2 is a section of the forward edge of one wing with the nose section in the normal flight position.

The aircraft 10 has a pair of wings 12, each of which includes a main wing section 14 incorporating a transverse front spar 16 (FIGURE 2). In front of the spar 16 is pivotally mounted adjacent its lower trailing edge a droop nose section 18 which in normal flight position (FIGURE 2) has a common chord line with the main section 14. The droop nose section is formed as a pair of sections 20 and 22 extending along the span of the wing 12 and interconnected so as to form as it were one section. Hereinafter, only one section 20 will be described in detail, as the other section is similar.

Figure 3:
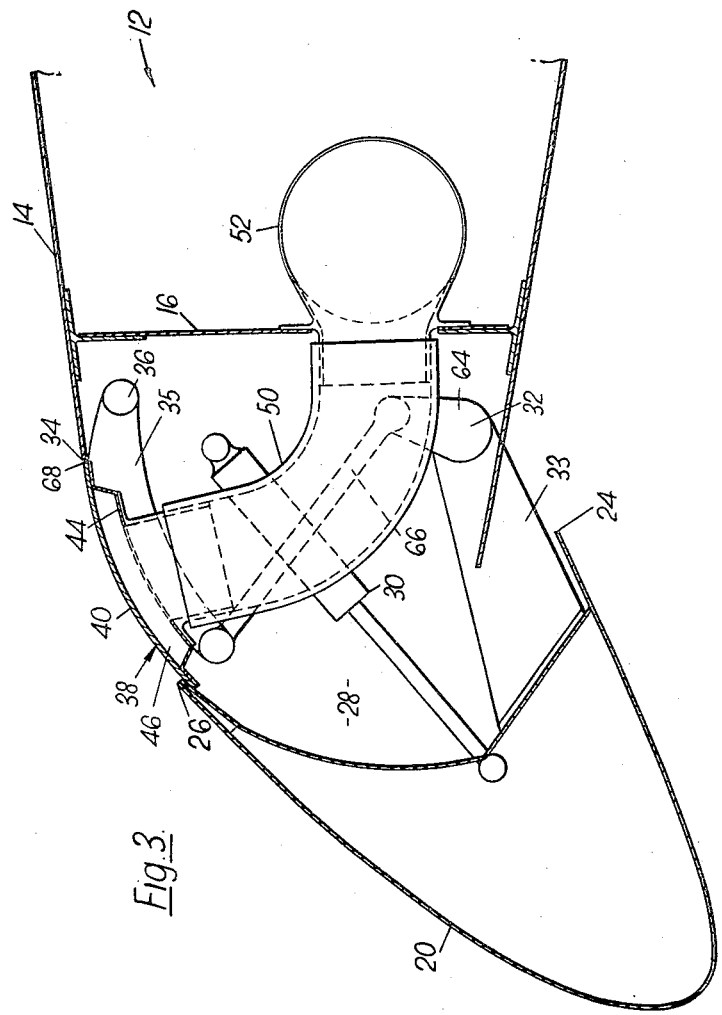
FIGURE 3 is a similar section with the nose section in the drooped position.

In the rear of the nose section 20 between the lower and upper trailing edges 24 and 26 is a recess 28 within which are located hydraulic jacks 30 which are retracted in the normal flight position of the nose section. The jacks are extensible to depress the leading edge of the nose section 20 by pivoting the nose section about its hinge 32 until the nose section reaches a drooped position (FIGURE 3). The nose section 20 is connected to its hinge by beams 33, which pass through slots in the lower surface of the main wing section (in the drooped position).

In the normal flight position (FIGURE 2) the upper trailing edge 26 of the nose section is a close fit with an upper leading edge 34 of the main section 14 projecting forwardly from the front spar 16. In this position, the upper surfaces of the nose section 20 and main section 14 present a continuous profile forming part of the wing section profile.

Figure 1:
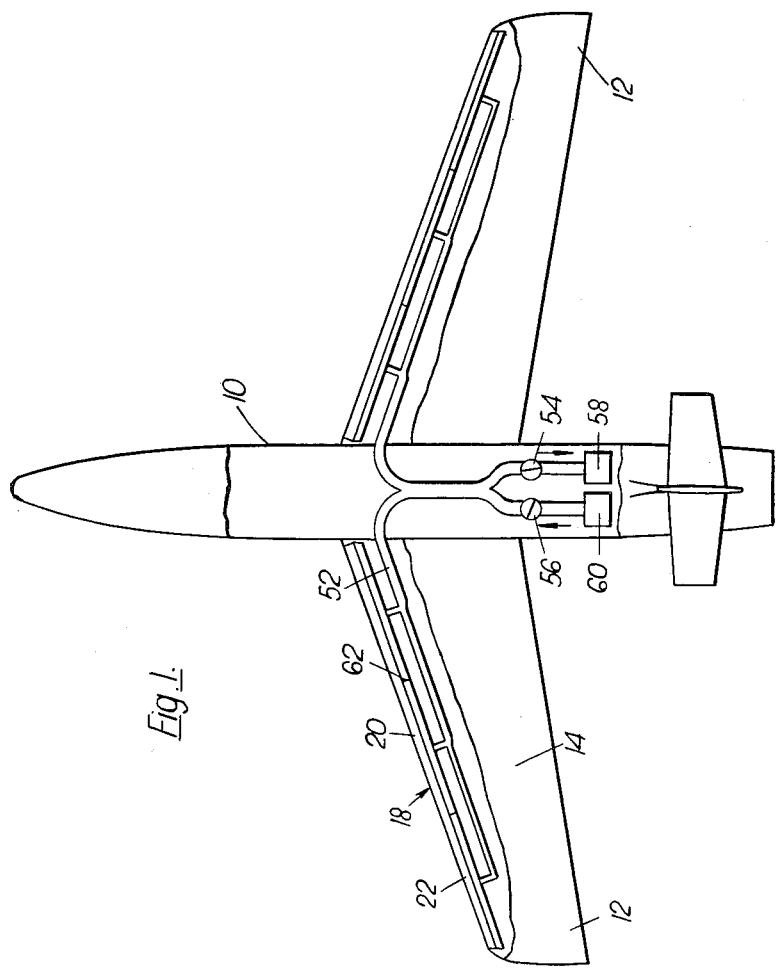
FIGURE 1 is a diagrammatic plan view of an aircraft having a pair of wings according to the invention.

Pivotally mounted on hinge members 35 about a hinge 36 just below the projecting forward edge 34 of the main section is a closure plate 38. The closure plate 38 in retracted flight position is disposed within the recess 28 in the rear of the nose section 20. The plate 38 has a curved upper wall 40 which is made permeable by a large number of small perforations. The recess 28 is of such shape that the lower surface 42 of the rearward upper part of the nose section is curved and, in the normal flight position, covers the permeable wall 40 to protect it. Connected to the upper wall 40 by two Z-shape members is a lower wall 44 spaced from the upper wall 40 to form a chamber 46 therebetween. The lower wall 44 is apertured at intervals and the apertures 48 are flanged and connected by extensible resilient hose 50 to apertured connectors 51 in the front spar 16 which lead to a common transverse duct 52. The duct 52 is connected to control valves 54 and 56 (FIGURE 1) by which it can be connected either to a source of suction 58 or to a source of air under pressure 60. Between the apertures 48 in the lower wall, the upper and lower walls are joined by a divider wall 62 (FIGURE 1) which separates the interior of the closure plate into separate chambers each with its own connection to the common duct. The diameter of the duct 52 increases from end to end as additional chambers are connected thereto.

Connected to the beams 33 of the nose section 20 by a torsion bar (not shown) is a crank 64 which is angularly movable with the beams 33 of the nose section and is connected by a link 66 to the hinge member 35 of the closure plate. In the normal flight position, the closure plate 38 is held by the link 66 to space it from the nose section 20. In the drooped position of the nose section, the crank 64 pushes the link 66 so as to pivot the closure plate 38 about its hinge 36 into an operative position.

In the operative position, the curved upper wall 40 of the closure plate 38 forms a continuation of the upper surfaces of the nose and main sections of the wing. The rear edge 68 of the upper wall (FIGURE 3) is a close fit with the projecting leading edge 34 of the main section and the front portion of the upper wall bears against the inner surface of the trailing edge 26 of the nose section.

Upon retraction of the jacks 30 to move the nose section back to the normal flight position, the crank 32 is rotated to draw the link downwardly and to pivot the closure plate 38 to the retracted flight position which permits return of the nose section.

In use with an aircraft about to take off on a flight the nose section is moved to the drooped position (FIGURE 3) to increase the lift of the wings at slow speed. The closure plate 38 is moved by means of the crank 32 to the operative position and the control valve 54 operated to connect the common duct 52 to the source of suction 58. This causes a pressure drop across the upper wall 40 of the closure plate 38 and air is sucked through the perforations into the chambers 46 and thence through the hose 50 to the common duct 52. Thus, part of the boundary layer of air is removed in a region of high rate of change of surface curvature of the wing profile which is associated with a rising air pressure. Separation of the boundary layer and wing stall are delayed, enabling the aeroplane to fly at higher lift coefficients and hence lower speeds. Take off distance is thereby reduced.

After a suitable high flying speed is reached, the jacks 30 are operated to bring the nose section back to the normal flight position. As such return commences, the crank 32 rotates to move the link and closure plate to the retracted flight position, in which return of the nose section to the normal flight position is permitted. After the flight positions have been reached (FIGURE 2), the wing presents a profile suitable to high speed flying and the permeable plate is protected by the nose section.

The suction control valve 54 is closed either then or before pivotation commences and the other control valve 56 can be opened to connect the common duct 52 to the source of air under pressure 60. This source may be of air bled from aircraft gas turbine engines. This air under pressure causes a pressure rise across the upper wall 40 of the closure plate, as a result of which air passes outwardly through the perforations in the upper wall to clear out obstructions therein. Such obstructions may have been caused during take off by the entry of fine particles of dirt, dust or other foreign matter, and of insects. This supply of air may also be hot for de-icing purposes. The control valve 56 is then closed again.

To prepare for landing after a high speed flight, the nose section is moved to the drooped position by the jacks and the closure plate is moved to the operative position, as before take off. Suction is applied by the control valve 54 to the common duct 52 and to the chambers in the closure plate so as to withdraw part of the boundary layer air and to reduce the speed at which stalling occurs. This effectively reduces the landing speed and the length of landing runway necessary.

After landing, the upper wall of the closure plate can again be cleaned by applying air under pressure to the common duct.

Whilst the operation has been described as applied to take off and landing, it will be understood that use of the invention in flight is not excluded. The invention may also be applied to other aircraft surfaces over which enveloping air flows during aircraft forward movement and which have two adjacent parts which are relatively movable to a position in which they are separated.

A number of alternative constructions is available and modifications within the scope of the invention are possible. For example, screw jacks, instead of hydraulic jacks, may be used, controlled and driven from a common transverse torque tube drive shaft.

Whilst the upper wall has been described as perforated it will be understood that other forms of permeable wall may be used.

I claim:

1. An aircraft surface over which enveloping fluid flows during aircraft forward movement and which has first and second adjacent parts which are relatively movable to a position in which they are separated, including a closure member for the space between the surface parts in their separated position, the closure member including a permeable element and being articulated to the first of said parts for movement relatively to both said parts between an extended position, in which the permeable element is exposed and lies between the surface parts in their separated position, and a retracted position, in which the permeable element is covered by the surface parts in their adjacent position, means operatively connected between the closure member and said second surface part to automatically move said closure member to its extended position when the two surface parts are moved to their separated position, and means to produce a pressure differential across the permeable element.

2. An aircraft surface over which enveloping fluid flows during aircraft forward movement and which has two adjacent parts which are relatively movable to a position in which they are separated, including a closure member for the space between the surface parts in their separated position, the closure member including a permeable element, means to move the closure member between an extended position, in which the permeable element is exposed and lies between the surface parts in their separated position, and a retracted position, in which the permeable element is covered by the surface parts in their adjacent position, means to produce a lower-than-atmospheric pressure in the closure member and a pressure drop across the permeable element, and means to produce a higher-than-atmospheric pressure in the closure member and a pressure rise across the permeable element.

3. A droop nose aircraft wing having a main wing section, a nose section pivotally mounted adjacent its lower trailing edge on the main wing section for movement from a normal flight position in which the nose and main sections have a common chord line, to a drooped position in which the nose section chord line extends forwardly and downwardly from the main section chord line, and in which the upper trailing edge of the nose section is spaced from the upper forward edge of the main section, a closure member including an outer wall for the space between the nose and main sections, and pivotally mounted on said main wing section to be movable relatively to both said nose and main wing sections from an operative position, in the drooped position of the nose section, in which the outer wall forms a continuation of the upper surfaces of the nose and main sections, to a retracted flight position which permits return of the nose section to its normal flight position, said outer wall being formed at least in part by a permeable element spaced from an inner wall to form a chamber therebetween, means operatively connected between the closure member and said nose section to automatically move said closure member to its operative position when the nose is moved to its drooped position, and means connectible to the chamber to produce a pressure differential across the porous element.

4. A droop nose aircraft wing having a main wing section, a nose section pivotally mounted adjacent its lower trailing edge on the main wing section for movement from a normal flight position in which the nose and main sections have a common chord line, to a drooped position in which the nose section chord line extends forwardly and downwardly from the main section chord line, and in which the upper trailing edge of the nose section is spaced from the upper forward edge of the main section, a closure member including an outer wall for the space between the nose and main sections, movable from an operative position, in the drooped position of the nose section, in which the outer wall forms a continuation of the upper surfaces of the nose and main sections to a retracted flight position which permits return of the nose section to its normal flight position, said outer wall being formed at least in part by a permeable element spaced from an inner wall to form a chamber therebetween, suction means connectible to the chamber to produce a pressure drop across the porous element and pressure means connectible to the chamber to produce a pressure rise across the porous element.

5. A wing as claimed in claim 4, wherein said closure member is pivotably mounted on the main wing section and means is provided to correlate its movement with that of the nose section.

6. A wing as claimed in claim 5, including an extensible tube connected between the chamber and a duct in the main wing section.

7. A wing as claimed in claim 4, including a number of nose sections, each with a closure member.

8. A wing as claimed in claim 7, wherein the chambers of the closure members are connected to a common duct in the wing.

9. A wing as claimed in claim 8, wherein the cross-sectional area of the duct alters as additional chambers are connected thereto.

10. A wing as claimed in claim 4, including a nose section with a number of closure members.

11. A wing as claimed in claim 10, wherein the chambers of the closure members are connected to a common duct in the wing.

12. A wing as claimed in claim 11, wherein the cross-sectional area of the duct alters as additional chambers are connected thereto.

13. An aircraft having a fuselage and a pair of droop nose wings, each as claimed in claim 4, wherein the pressure and suction means are contained in the fuselage and are connected through valves to the chambers of the closure members.

References Cited in the file of this patent

UNITED STATES PATENTS

| | | |
|---|---|---|
| 2,395,513 | Stalker | Feb. 26, 1946 |
| 2,517,524 | Beck | Aug. 1, 1950 |
| 2,876,966 | Cook | Mar. 10, 1959 |
| 2,945,644 | Colman | July 19, 1960 |

FOREIGN PATENTS

| | | |
|---|---|---|
| 702,926 | Germany | Feb. 24, 1941 |